United States Patent
Zheng

(10) Patent No.: US 10,094,953 B2
(45) Date of Patent: *Oct. 9, 2018

(54) SELF-HEALING HARD COATINGS

(71) Applicant: ESSILOR INTERNATIONAL (COMPAGNIE GÉNÉRALE D'OPTIQUE), Charenton-le-Pont (FR)

(72) Inventor: Haipeng Zheng, Dallas, TX (US)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/915,817

(22) PCT Filed: Sep. 3, 2013

(86) PCT No.: PCT/IB2013/002633
§ 371 (c)(1),
(2) Date: Mar. 1, 2016

(87) PCT Pub. No.: WO2015/033183
PCT Pub. Date: Mar. 12, 2015

(65) Prior Publication Data
US 2016/0223718 A1    Aug. 4, 2016

(51) Int. Cl.
| | | |
|---|---|---|
| C08G 18/44 | (2006.01) | |
| C08G 77/16 | (2006.01) | |
| C08G 77/28 | (2006.01) | |
| C09D 175/06 | (2006.01) | |
| C09D 183/06 | (2006.01) | |
| C09D 183/08 | (2006.01) | |
| C09D 1/00 | (2006.01) | |
| C09D 5/00 | (2006.01) | |
| C09D 7/12 | (2006.01) | |
| G02B 1/10 | (2015.01) | |
| G02B 1/14 | (2015.01) | |
| C09D 7/40 | (2018.01) | |
| C09D 7/61 | (2018.01) | |
| C08K 3/22 | (2006.01) | |
| C08K 5/5435 | (2006.01) | |

(52) U.S. Cl.
CPC ............ *G02B 1/14* (2015.01); *C08G 18/44* (2013.01); *C09D 5/00* (2013.01); *C09D 7/40* (2018.01); *C09D 7/61* (2018.01); *C09D 175/06* (2013.01); *C09D 183/06* (2013.01); *C09D 183/08* (2013.01); *C08G 77/16* (2013.01); *C08G 77/28* (2013.01); *C08K 3/22* (2013.01); *C08K 3/2279* (2013.01); *C08K 5/5435* (2013.01); *C08K 2003/2231* (2013.01)

(58) Field of Classification Search
None
See application file for complete search history.

(56) References Cited

U.S. PATENT DOCUMENTS

| | | | |
|---|---|---|---|
| 7,872,078 B2 | 1/2011 | Foringer et al. | 525/440.01 |
| 2009/0062453 A1* | 3/2009 | Foringer | C08G 18/4063 524/500 |
| 2009/0098299 A1* | 4/2009 | Cheng | C08J 7/047 427/384 |
| 2011/0003159 A1* | 1/2011 | Mather | B32B 7/02 428/425.6 |
| 2011/0034585 A1* | 2/2011 | Christmann | B82Y 30/00 523/209 |
| 2014/0070149 A1* | 3/2014 | Valeri | C08K 3/22 252/519.33 |

FOREIGN PATENT DOCUMENTS

| | | | | |
|---|---|---|---|---|
| WO | WO 2006/055409 | 5/2006 | | |
| WO | WO 2009/029641 | 3/2009 | | |
| WO | WO 2012/105974 | 8/2012 | | |
| WO | WO 2012105974 A1 * | 8/2012 | ....... | B29D 11/00865 |
| WO | WO 2012/177239 | 12/2012 | | |
| WO | WO 2012177239 A1 * | 12/2012 | ............ | G02B 1/105 |

OTHER PUBLICATIONS

International Search Report and Written Opinion issued in PCT/IB2013/002633, dated Jun. 4, 2014.
International Search Report and Written Opinion issued in PCT/IB2013/002624, dated Mar. 18, 2014.

* cited by examiner

Primary Examiner — Peter A Salamon
(74) Attorney, Agent, or Firm — Norton Rose Fulbright US LLP

(57) ABSTRACT

A method is presented herein that involves mixing a self-healing coating solution, a dispersion of colloidal nanoparticles, and at least one of a solvent or a surfactant, to obtain a composition, wherein the composition is capable of being cured into a coating that is transparent to visible light. An ophthalmic lens product obtained by this method is also presented herein.

14 Claims, No Drawings

SELF-HEALING HARD COATINGS

CROSS-REFERENCE TO RELATED APPLICATIONS

This application is a national phase application under 35 U.S.C. § 371 of International Application No. PCT/IB2013/002633 filed 3 Sep. 2013. The entire contents of the above-referenced disclosure is specifically incorporated herein by reference without disclaimer.

TECHNICAL FIELD

The invention disclosed herein is in the field of self-healing or self-repairing hard coat materials, and more particularly to compositions and methods of preparing such coatings.

BACKGROUND

The compositions, articles, and methods disclosed herein have applications in fields utilizing self-healing or self-repairing hard coatings, especially transparent hard coatings. This disclosure focuses on applications in the ophthalmic field, however, one skilled in the art will recognize applications in additional areas, such as automotive and window technology. More specifically, this disclosure focuses on compositions of, methods of production for, and ophthalmic articles having clear, scratch-resistant and self-healing coatings.

Self-healing coatings are able to repair themselves, i.e., coatings which would be able, when submitted to a simple physical treatment, to revert completely or partially to an initial non-scratched condition. Examples of such self-healing coatings have been disclosed by Bayer, PPG Industries (Revivance™), Suprapolix BV, and CRG (Veriflex® and also US 2009/062453 and WO 2009/029641). Self-healing coatings are primarily prepared from polyurethanes, epoxies, and shape-memory (co)polymers, which show healing effects after thermal, UV, or humidity treatments. These materials further contain active capsules which can crosslink with other elements once cracks or holes in the coatings appear and open the capsules.

For example, PPG Industries has disclosed coatings which show interesting room-temperature healing effects and even better healing effects upon immersion in warm water. The PPG coatings, marketed as Revivance™ coatings, and the modified coatings are exemplary self-healing coatings. These coatings are primarily prepared from polyurethanes (PU), which show healing effects after thermal or humidity treatments. Self-healing coatings are disclosed in U.S. Pat. No. 7,872,078, and International Patent Application Publication WO2009029641A, which are hereby incorporated herein in their entirety for all purposes.

However, some of these coatings exhibited less than satisfactory results when applied to an ophthalmic lens, such as a polycarbonate (PC) lens. For example, the self-healing coatings were out-performed by previously known hard coating products commercially available at Essilor International, even after a long-term healing process at room temperature. Therefore, there is a need for a composition, and method of making a composition, to improve the scratch-resistance or healing performance of self-healing coatings for ophthalmic uses.

SUMMARY

Presented herein are methods of making compositions and compositions for self-healing, scratch resistant, transparent coatings having at least one of a colloidal nanoparticle and a hydroxyl polyhedral oligomeric silsesquioxane (POSS) cage compound.

The composition is curable and can be coated onto a surface, such as an ophthalmic lens, and then cured. A composition according to the invention includes a method comprising the steps of mixing a self-healing coating solution, a dispersion of colloidal nanoparticles, and at least one of a solvent or a surfactant, to obtain a composition, wherein the composition is capable of being cured into a coating that is transparent to visible light. An ophthalmic lens product obtained by this method is also presented herein.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION

The words or terms used herein have their plain, ordinary meaning in the field of this disclosure, except to the extent explicitly and clearly defined in this disclosure or unless the specific context otherwise requires a different meaning. If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite article "a" or "an" means one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

As used herein, a "particle" refers to a body having a finite mass and sufficient cohesion such that it can be considered as an entity but having relatively small dimensions. "Nanoparticles" are normally considered to be particles having dimensions of in the range of about 5 nm to about 300 nm.

A "dispersion" is a system in which particles of a substance of one chemical composition and physical state are dispersed in another substance of a different chemical composition or physical state.

As used herein, "self-healing coatings" are layers or coatings that are able to repair themselves completely or partially, i.e., coatings which are able, when submitted to a simple physical treatment such as time-delay or water immersion, to revert completely or partially to an initial un-scratched condition.

"Revivance™" coatings and solutions are trade names used by PPG Industries, Inc., and refer to self-healing materials disclosed in U.S. Pat. No. 7,872,078, to Foringer, et al. Generally, these self-healing coating (SHC) compositions are described as consisting of at least one polycarbonate polyol, at least one isocyanate, and at least one solvent and surfactant. The trademark "Revivance™" is used to refer to the solutions, which contain compounds and solvents, and to the cured or hardened coatings or layers.

A "polycarbonate (PC) resin" or plastic refers to any of a group of thermoplastic polymers containing carbonate groups. PC plastic is commonly used in ophthalmic products such as eyeglass lenses. Allyl diglycol carbonate (ADC) plastic, also known as "CR-39®," is a plastic polymer of diethyleneglycol bis allylcarbonate in the presence of a diisopropyl peroxydicarbonate (IPP) initiator and heat. A peroxide can also be used as an initiator. The presence of the allyl groups allows the polymer to form cross-links. ADC plastic is a thermosetting polymer. ADC plastic is commonly used in the manufacture of eyeglass lenses. A commercial example is ORMA™ lenses available from Essilor International. Other examples of lenses are thio-polyurethane lenses, methacrylic lenses, or other high index plastic lenses.

As used herein, a "plano" lens does not have an optical power for correcting vision.

As used herein, "transparent" means having at least 80% transmittance to the full spectrum of visible light.

As used herein, "transmittance" is the ratio of transmitted light to total light directed through a medium at a particular wavelength or over a spectrum.

As used herein, "haze" is the ratio of diffuse transmittance divided by total transmittance.

As used herein, "ASW" test refers to an Automated Steel Wool test. In the ASW test, a coated lens sample is measured by a Hazegard XL-211 Plus meter to get an initial haze value (Haze$_0$). The convex side of the lens is rubbed by a steel wool (000 grade) for five cycles where one cycle is one forward and one backward motion, under 1200 g of load using an automated steel wool machine. The lens is again measured by the Hazegard XL-211 Plus meter to get the scratched haze value (Haze$_S$). The lower the haze, the better the scratch-resistance of a lens. After keeping the lens at room temperature (20-22° C., 40-50% humidity) for 5 hours, the lens is measured again by the Hazegard XL-211 Plus meter to get the final haze value (Haze$_{hr}$). The lower the haze, the better final scratch-resistance of a lens. The healing performance or level, referred to herein as Healing 1, is calculated by the following equation: (Haze$_s$–Haze$_{hr}$) divided by Haze$_s$, with the result expressed as a percentage. The lens is then immersed in warm water (at 60° C. for 15 minutes), and, after cleaning with DI water and air blow drying, the lens is measured again by the Hazegard XL-211 Plus meter to get the haze value (Haze$_{hw}$). The lower the haze, the better the final scratch resistance of the lens. The healing performance or level, referred to herein as Healing 2, is calculated by the following equation: (Haze$_S$–Haze$_{hw}$) divided by Haze$_S$. The result is expressed as a percentage.

Presented herein is a method of introducing at least one of, and preferably both, colloidal nanoparticle materials and hydroxyl POSS® materials into a self-healing, transparent coating.

The modified self-healing coatings described herein showed either better scratch resistance or healing performances than the coatings without modifications. There is an optimum combination of the amount of colloidal nanoparticles and hydroxyl POSS® in the coatings because the performances of the coatings decreased after adding a certain percentage of both materials.

The solutions, coatings, and coated optical articles of this invention include a self-healing coating formed from a composition comprising at least one polycarbonate polyol, at least one isocyanate or a blocked isocyanate, at least one solvent, and at least one surfactant.

The polycarbonate polyol is a (preferably saturated) oligomer or a polymer or a mixture thereof, having at least two hydroxyl functions on each end of its main chain and which comprises at least one carbonate function per monomer unit. An example includes poly(hexamethylenecarbonate) glycol.

The polyisocyanate may comprise blocked isocyanate groups. The blocked isocyanate may be used as a latent crosslinking agent and/or adhesion promoter in the coating process. Suitable blocking agents may be selected from alcohols such as methanol, lactams such as caprolactam, ε-Caprolactam (ε-Cap), oximes such as acetone oxime, diisopropylamine, 1,2,4-triazole, imidazole, methylethylketoxime (MEKO), diethyl malonate (DEM), ethyl acetoacetate, pyrazoles such as 3,5-dimethylpyrazole (DMP), N-tert-butylbenzylamine, cyclopentanone and their mixtures.

The polyisocyanate may include a single trifunctional polyisocyanate or a mixture of two or more different tri-functional polyisocyanates, and may be selected from one or more polyisocyanates such as triisocyanates, including isocyanurates. Suitable trifunctional isocyanates include, but are not limited to, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name Cythane 3160 by Cytec Industries, Inc., Desmodur® N 3300, which is the isocyanurate of hexamethylene diisocyanate, and Desmodur® Z 4470, a trimer of isophorone diisocyanate, both available from Bayer Corporation. Specifically used polyisocyanates are cyclic isocyanates, particularly, isocyanurates of diisocyanates such as hexamethylene diisocyanate and isophorone diisocyanate.

Isocyanates described herein may be linear aliphatic isocyanates, cycloaliphatic isocyanates, or arylalkyl or alkylaryl isocyanates. In one exemplary embodiment, the isocyanates may be a saturated isocyanates. Specific examples include hexylene diisocyanate (HDI), octamethylene diisocyanate, decamethylene diisocyanate, 2,2,4- or 2,4,4-trimethyl hexamethylene diisocyanate, dodecane diisocyanate, 1,4-diisocyanobutane, 4,4'-diisocyanatocyclohexylmethane (HDMI), methylcyclohexylene diisocyanate (HTDI), isophorone diisocyanate (IPDI), 1,6-diisocyanatohexane (HDI), 1,3- and 1,4-bisisocyanatomethylcyclohexane, their dimers and trimers, such as uretdiones of HDI and/or IPDI and HDI biuret, and mixtures thereof.

Solvents described herein may be chosen from the glycol ether type, i.e. from alkyl ethers of glycols, their esters, and mixtures thereof, including propylene glycol methyl ether acetate. The solvent may represent from about 20 wt % to about 70 wt % of the weight of the composition used to form the self-healing coating.

Surfactants described herein may be chosen from polyether-modified siloxanes (especially polydimethylsiloxanes), used alone or in a solvent, such as those marketed by BYK. The surfactant may represent from about 0.05 wt % to about 1.0 wt %, preferably from about 0.1 wt % to about 0.3 wt %, of the weight of the composition used to form the self-healing coating.

Self-healing coatings described herein may have a storage modulus smaller than 1500 MPa at 23° C. and/or a glass transition temperature comprised in the range from about 20° C. to about 70° C. The thickness of self-healing coatings described herein generally range from about 3 μm to about 15 μm, for instance from about 7 μm to about 14 μm. Due to the self-healing coating, scratches can be suppressed from the optical article according to the present invention, either at room temperature or by dipping the optical article with the cured and scratched self-healing coating into water brought to a temperature of between about 50° C. and about 60° C. for 1 to 60 minutes, preferably from 10 to 20 minutes, for instance for about 15 minutes.

EXAMPLES

To facilitate a better understanding of the present invention, the following examples of some embodiments are given. In no way should the following examples be read to limit, or define, the entire scope of the invention.

Introducing Colloidal Nanoparticles

Experiments were conducted to introduce colloidal nanoparticles into a transparent SHC solution by physical blending. The colloidal nanoparticles used in the present invention have an average particle size in the range of about 5 nm to about 15 nm. The nanoparticles may be conductive, non-conductive, or semi-conductive. They may be selected from the group consisting of conductive metallic oxide particles, such as, but not limited to, $Sb_2O_3$, $SnO_2$, ITO, ATO ($SnO_2/Sb_2O_5$), PTO ($SnO_2/P_2O_5$), and conductive metal nanoparticles, such as, but not limited to, Au, Ag, Cu, and any combination thereof. Non-conductive nanoparticles can be used, such as, but not limited to, $TiO_2$ and $Al_2O_3$, and any combination thereof. Alternatively, semi-conductive nanoparticles can be used, such as, but not limited to, ZnO.

In one aspect, the colloidal nanoparticles can be inorganic nanoparticles that can have a thermal conductivity that is at least ten times that of an initial polymer used in any of the solutions described herein. More particularly, the inorganic nanoparticles can have a thermal conductivity that is at least one hundred times higher than an initial polymer used in any of the solutions described herein.

As will be apparent from the examples, colloidal nanoparticles $Sb_2O_3$ and $SnO_2$, when added in a sufficient amount, significantly increase the self-healing performance of coatings and are satisfactory with regard to initial haze and haze after self-healing. These conductive metallic oxides therefore are particularly preferred.

The transparent SHC solution used was the modified Revivance™ coating solution, generally described as consisting of at least one polycarbonate polyol, at least one blocked polyisocyanate, and at least one solvent and surfactant. Mixtures were prepared by adding a dispersion of colloidal $SnO_2$ nanoparticles (ELCOM NE-1003PTV) ($SnO_2$ colloid, 15 wt %, from JGC C&C, Ltd.), $Sb_2O_3$ nanoparticles (ELCOM NE-1002SBV) ($Sb_2O_3$ colloid, 19 wt %, from JGC C&C, Ltd.), or ITO nanoparticles (ELCOM NE-1001ITV) (ITO colloid, 20 wt %, from JGC C&C, Ltd.), a solvent (Dowanol® PM, or propylene glycol methyl ether, available from Dow Chemical Company), and a surfactant (BYK®-341, a silicone surface additive for solvent-borne and aqueous coating systems, consisting of a solution of a polyether modified polydimethylsiloxane, available from BYK USA, Inc.), into the self-healing coating solution. All conductive nanoparticles described herein were 10-15 nm in diameter, but other size ranges can be used. ELCOM NE 1002SBV and ELCOM NE 1003PTV were compatible with the self-healing solutions.

Introducing Conductive $Sb_2O_3$ Nanoparticles

In this experiment, mixtures were prepared by adding a dispersion of colloidal $Sb_2O_3$ nanoparticles ("SBV") to the self-healing modified Revivance™ solution.

Six coating solutions, S1-S6, were prepared by adding different amounts of $Sb_2O_3$ colloidal solution, a solvent (Dowanol® PM), and a surfactant (BYK®-341) into the SHC solution. The resulting solutions, S1-S6, were prepared at about 45 wt % of solid content. The SHC reference solution R was also prepared at about 45 wt % of solid content. Similar coating thicknesses were used for the reference (R) and S1-S6 solutions.

The solid percentage of SBV nanoparticles in a dry coating of S1-S6 is calculated as 2.0, 3.9, 5.7, 7.6, 9.3 and 11.0 wt %, respectively. The corresponding volume percentage of SBV colloids in a dry coating of S1-S6 is calculated as 0.5, 1.0, 1.5, 2.0, 2.5 and 3.0 vol %, respectively, where the density of the SHC (R) and the SBV nanoparticle is considered as 1.3 g/cm³ and 5.2 g/cm³. TABLE 1 below indicates the components of the tested solutions.

TABLE 1

| Solution | SHC (g) | SBV (g) | Dowanol PM (g) | BYK-341 (g) |
|----------|---------|---------|----------------|-------------|
| R        | 39.95   | 0.00    | 10.00          | 0.05        |
| S1       | 39.15   | 2.35    | 8.45           | 0.05        |
| S2       | 38.40   | 4.60    | 6.95           | 0.05        |
| S3       | 37.60   | 6.80    | 5.55           | 0.05        |
| S4       | 36.90   | 8.95    | 4.10           | 0.05        |
| S5       | 36.20   | 11.05   | 2.70           | 0.05        |
| S6       | 35.50   | 13.05   | 1.40           | 0.05        |

The coatings were prepared by a spin coating process on bare, plano Orma™ lenses at a speed of 600 rpm (10 s)/1000 rpm (5 s) to a target thickness (about 5 μm to about 7 μm of a dry coating, more preferably 7 μm), and then cured at 126° C. in a conventional oven for 3 hours.

The scratch and healing performances of the S1-S6 coatings after an ASW test are listed below in TABLE 2.

TABLE 2

| Coating | Haze$_0$, % | Haze$_s$, % | Haze$_{hr}$, % | Healing 1, % | Haze$_{hw}$, % | Healing 2, % |
|---|---|---|---|---|---|---|
| R  | 0.16 | 8.92 | 5.30 | 41 | 4.95 | 44 |
| S1 | 0.15 | 8.83 | 4.56 | 48 | 4.53 | 49 |
| S2 | 0.14 | 8.79 | 3.85 | 56 | 3.66 | 58 |
| S3 | 0.14 | 8.01 | 3.39 | 58 | 3.23 | 60 |
| S4 | 0.14 | 6.80 | 2.98 | 56 | 2.92 | 57 |
| S5 | 0.14 | 8.15 | 3.81 | 53 | 3.71 | 55 |
| S6 | 0.15 | 9.69 | 4.66 | 52 | 4.62 | 52 |

The testing results showed that the final scratch resistance of all coatings was improved by adding SBV nanoparticles, especially the S4 coating, having 2.0 vol % or 7.6 wt % of SBV nanoparticles in the SHC, which exhibited the lowest scratched haze and final haze among all tested coatings. The S4 coating showed better scratch resistance (2.92% of haze) and better healing performance (57% in warm water) than the Reference coating R (4.95% of haze; 44% of healing in warm water). The S3 coating was also considered a good SHC.

Adding Conductive $SnO_2$ Nanoparticles

A similar testing regimen was performed with conductive nanoparticles of $SnO_2$, in the form of a $SnO_2$ colloidal solution, ELCOM NE 1003PTV, ("PTV"), added to the SHC solution.

Five coating solutions, P1-P5, were prepared by adding PTV solution, a solvent (Dowanol® PM), and a surfactant (BYK®-341), into the self-healing solution. The solutions P1-P5 were prepared at about 45 wt % of solid content. The solid percentage of $SnO_2$ nanoparticles in a dry coating of P1-P5 is calculated as 1.1, 2.1, 2.6, 3.9, and 5.1 wt %, respectively. If the density of the reference coating R and the $SnO_2$ nanoparticles is considered as 1.3 g/cm$^3$ and 5.2 g/cm$^3$, the corresponding volume percentage of $SnO_2$ nanoparticles in a dry coating of P1-P5 is calculated as 0.2, 0.4, 0.5, 0.8 and 1.0 vol %, respectively. For comparison purposes with the SBV coatings, 0.5 and 1.0 vol % of coatings were tested, as noted in. TABLE 3 below.

TABLE 3

| Solution | SHC (g) | PTV (g) | Dowanol PM (g) | BYK-341 (g) |
|---|---|---|---|---|
| P1 | 39.50 | 1.62 | 8.83 | 0.05 |
| P2 | 38.85 | 3.15 | 7.95 | 0.05 |
| P3 | 38.60 | 3.95 | 7.40 | 0.05 |
| P4 | 37.95 | 5.85 | 6.15 | 0.05 |
| P5 | 37.35 | 7.70 | 4.90 | 0.05 |

The scratch and healing performances of the P1-P5 coatings after an ASW test are listed below in TABLE 4.

TABLE 4

| Coating | Haze$_0$ % | Haze$_s$ % | Haze$_{hr}$, % | Healing 1 % | Haze$_{hw}$ % | Healing 2 % |
|---|---|---|---|---|---|---|
| R  | 0.16 | 8.92 | 5.30 | 41 | 4.95 | 44 |
| P1 | 0.14 | 6.91 | 3.28 | 53 | 2.95 | 57 |
| P2 | 0.13 | 3.77 | 1.46 | 61 | 1.45 | 62 |
| P3 | 0.15 | 5.60 | 1.96 | 65 | 1.94 | 65 |
| P4 | 0.14 | 6.01 | 1.97 | 67 | 1.93 | 68 |
| P5 | 0.15 | 7.77 | 2.20 | 72 | 2.08 | 73 |

The testing results showed that the final scratch resistance of the P1-P5 coatings was improved by adding $SnO_2$ nanoparticles. The P2 coating, having 0.4 vol % and 2.1 wt % of $SnO_2$ nanoparticles in the SHC, exhibited the lowest scratched haze and final haze, indicating better scratch resistance (1.46% of haze) and better healing performance (61% at room temperature) than the R coating (5.30% of haze; 41% of healing at room temperature).

Introducing Hydroxyl POSS®

The self-healing coatings used in the experiments are based on polyurethane (PU) chemistry, and generally described as having monomers including diols or polyols, and blocked polyisocyanate.

Adding POSS®-Polyol (POSS Hard Segment on the Main Chain of Cross-Linked Polymers)

This experiment tested coating solutions consisting of POSS®-polyol (POSS® refers to polyhedral oligomeric silsequioxanes, namely in the form of octa(3-hydroxy-3 methylbutyl dimethylsiloxy) POSS® (AL0136) or a POSS derivative, available from Hybrid Plastics, Inc. A POSS derivative described herein can also be mercapto-POSS, wherein the mercapto-POSS is selected from the group consisting of: POSS-dithiol, POSS-trithiol, POSS-polythiol. Five coating solutions A1-A5 were prepared by adding different amounts of POSS®-polyol, solvent (Dowanol® PM), and surfactant (BYK®-341) into the self-healing solution, respectively. The resulting solutions were prepared at about 45 wt % of solid content. The content of POSS®-polyol in a dry coating of A1-A5 is calculated as 1.0, 2.0, 3.0, 4.5 and 6.0 wt %, respectively, as described in TABLE 5 below.

TABLE 5

| Solution | SHC (g) | AL0136 (g) | Dowanol PM (g) | BYK-341 (g) |
|---|---|---|---|---|
| A1 | 39.58 | 0.23 | 10.14 | 0.05 |
| A2 | 39.08 | 0.45 | 10.42 | 0.05 |
| A3 | 38.70 | 0.68 | 10.57 | 0.05 |
| A4 | 38.08 | 1.01 | 10.86 | 0.05 |
| A5 | 37.52 | 1.34 | 11.09 | 0.05 |

The coatings were prepared using the same process as described above. The scratch and healing performances of the first three coating systems in the ASW test are listed below in TABLE 6.

TABLE 6

| Coating | Haze$_0$ % | Haze$_s$ % | Haze$_{hr}$, % | Healing 1 % | Haze$_{hw}$ % | Healing 2, % |
|---|---|---|---|---|---|---|
| R  | 0.16 | 8.92 | 5.30 | 41 | 4.95 | 44 |
| A1 | 0.10 | 8.36 | 3.13 | 63 | 2.85 | 66 |
| A2 | 0.11 | 7.00 | 3.08 | 56 | 2.74 | 61 |
| A3 | 0.11 | 7.05 | 2.96 | 58 | 2.67 | 62 |
| A4 | 0.15 | 7.60 | 4.14 | 46 | 3.91 | 49 |
| A5 | 0.15 | 8.04 | 4.46 | 45 | 4.39 | 45 |

All coatings showed slightly improved scratch resistance and some healing levels when POSS®-polyol was below 4.5 wt %, resulting in the lower final scratch haze. However, when POSS®-polyol was above 4.5 wt %, the scratch haze returned back toward the initial scratched haze level.

Adding POSS®-Diol (POSS Hard Segment on the Side Chain of Resulting Polymers)

This experiment tested coating solutions consisting of POSS®-diol, namely in the form of 1,2-Propanediol isobutyl POSS® (AL0130), available from Hybrid Plastics, Inc.

Four coating solutions, A6-A9, were prepared by adding different amounts of POSS®-diol, solvent (Dowanol® PM), solvent (THF), and surfactant (BYK®-341) into the self-healing solution, respectively. The resulting solutions were prepared at about 45 wt % of solid content. The content of POSS®-diol in a dry coating of A6-A9 is calculated as 1.0, 2.0, 3.0, and 4.5 wt %, respectively. The equivalent weight (per OH group) of POSS®-diol is 475 g/mol, while the equivalent weight of POSS®-polyol (AL0136)) is 213 g/mol. For comparison, the coating A7 or A9, having 2.0 or 4.5 wt % of POSS®-diol content, corresponds to the similar molar ratio of functional group (OH) to the coating A1 or A2, having 1.0 or 2.0 wt % of POSS®-polyol (AL0136) content (A1:0.001 mole of OH; A2: 0.002 mole of OH in POSS®), as described in TABLE 7 below.

TABLE 7

| Solution | SHC (g) | AL0130 (g) | Dowanol PM (g) | THF (g) | BYK-341 (g) |
|---|---|---|---|---|---|
| A6 | 39.58 | 0.23 | 5.14 | 5.00 | 0.05 |
| A7 | 39.08 | 0.45 | 5.42 | 5.00 | 0.05 |
| A8 | 38.70 | 0.68 | 5.57 | 5.00 | 0.05 |
| A9 | 38.08 | 1.01 | 5.86 | 5.00 | 0.05 |

The coatings were prepared using the same process described above. The scratch and healing performances of first three coating systems in the ASW test are listed below. The last coating, A9, showed high initial haze, 2.37%, without conducting scratch and healing tests, as described in TABLE 8.

TABLE 8

| Coating | $Haze_0$, % | $Haze_s$, % | $Haze_{hr}$, % | Healing 1, % | $Haze_{hw}$, % | Healing 2, % |
|---|---|---|---|---|---|---|
| R | 0.16 | 8.92 | 5.30 | 41 | 4.95 | 44 |
| A6 | 0.18 | 8.58 | 5.19 | 40 | 4.54 | 47 |
| A7 | 0.42 | 7.56 | 4.61 | 39 | 3.55 | 53 |
| A8 | 0.86 | 6.77 | 4.02 | 41 | 2.83 | 58 |

Three coatings showed lower scratched haze and slightly better healing than the reference coating R, which resulted in a lower final haze, while these coatings maintained the similar healing level at room temperature. For the coatings A1 and A7, having a similar molar ratio of functional group (OH), A1 performs better than A7, showing a lower final haze and improved healing level.

Introducing Conductive Nanoparticles and Hydroxyl POSS

Experiments were conducted by adding SBV colloidal solution and POSS®-polyol (AL0136) into the diluted SHC solution. PTV colloidal solution was not tested. Further, POSS®-diol (AL0130) is not compatible with SBV colloidal solution when mixed into the SHC solutions, causing precipitation.

$Sb_2O_3$ Nanoparticles at 7.6 wt % and POSS®-Polyol at 2.0 or 3.0 wt % in a Dry SHC Two coating solutions, SA1 and SA2, were prepared by adding solvent (Dowanol® PM), and surfactant (BYK®-341), into the SHC solution, respectively, while keeping $Sb_2O_3$ nanoparticles at one concentration and varying the weight percentage of POSS®-polyol. The solid percentage of $Sb_2O_3$ nanoparticles in a dry coating of SA1 and SA2 is calculated as 7.6 wt % (corresponding to the best coating performances in previous tests). The weight percentage of POSS®-polyol in these two coatings is 2.0 and 3.0 wt %, respectively, as described in TABLE 9.

TABLE 9

| Solution | SHC (g) | AL0136 (g) | SBV (g) | Dowanol PM (g) | BYK-341 (g) |
|---|---|---|---|---|---|
| SA1 | 36.10 | 0.45 | 8.95 | 4.45 | 0.05 |
| SA2 | 35.70 | 0.67 | 8.95 | 4.63 | 0.05 |

The coatings were prepared using the same process described above. The scratch and healing performances of these two coating systems in the ASW test are listed below. The SA1 coating showed improved scratch resistance and healing level, resulting in lower final scratch haze (2.12%) than the S4, A2 and A3 coatings (>2.67%), as described in TABLE 10.

TABLE 10

| Coating | $Haze_0$, % | $Haze_s$, % | $Haze_{hr}$, % | Healing 1, % | $Haze_{hw}$, % | Healing 2, % |
|---|---|---|---|---|---|---|
| SA1 | 0.12 | 5.95 | 2.27 | 62 | 2.12 | 65 |
| SA2 | 0.12 | 7.00 | 4.39 | 37 | 4.24 | 40 |

$Sb_2O_3$ Nanoparticles at 6.1 wt % and POSS®-Polyol at 2.0 or 3.0 wt % in a Dry SHC Three coating solutions, S3.5, SA3, and SA4, were prepared as shown below. The solid percentage of $Sb_2O_3$ nanoparticles in a dry coating of S3.5, SA3, and SA4 is calculated as 6.1 wt %. The weight percentage of POSS®-polyol in these coatings is 2.0 and 3.0 wt %, as described in TABLE 11.

TABLE 11

| Solution | SHC (g) | AL0136 (g) | SBV (g) | Dowanol PM (g) | BYK-341 (g) |
|---|---|---|---|---|---|
| S3.5 | 37.50 | 0 | 7.20 | 5.25 | 0.05 |
| SA3 | 36.70 | 0.45 | 7.20 | 5.60 | 0.05 |
| SA4 | 36.20 | 0.67 | 7.20 | 5.78 | 0.05 |

The coatings were prepared using the same process as described above. The scratch and healing performances of three coating systems in the ASW test are listed below. The SA4 coating showed improved scratch resistance and healing level, resulting in lower final scratch haze (1.66%) than the coatings S3.5, A2 and A3 (>2.67%), as described in TABLE 12.

TABLE 12

| Coating | $Haze_0$, % | $Haze_s$, % | $Haze_{hr}$, % | Healing 1, % | $Haze_{hw}$, % | Healing 2, % |
|---|---|---|---|---|---|---|
| S3.5 | 0.16 | 7.75 | 2.91 | 62 | 2.76 | 64 |
| SA3 | 0.17 | 6.79 | 2.45 | 64 | 2.41 | 65 |
| SA4 | 0.13 | 5.59 | 1.68 | 70 | 1.66 | 71 |

Two types of conductive nanoparticles and POSS®-polyol used here are compatible with the SHC solutions. No haze issues were exhibited, as all coating compositions showed low haze, <0.2%. The coatings containing POSS®-diol showed high haze, likely due to its hydrophobicity and phase separation caused in the polymerized coatings. If the haze was not an issue, the coatings having 4.5 wt % of POSS®-diol could show even better scratch resistance and healing.

The influence of conductive nanoparticles on the compositions was exhibited as increased scratch-resistance and self-healing level. In particular, improvements were seen with nanoparticles in specific ranges (e.g., about 2.0 wt % to about 11.0 wt %, or about 3.9 wt % to about 9.3 wt % for $Sb_2O_3$, or about 5.0 wt % to about 8.5 wt %; about 1.1 wt % to about 5.1 wt % for $SnO_2$, or about 2.0 wt % to about 4.0 wt %).

The influence of hydroxyl POSS®, which can be a POSS derivative, on the compositions was exhibited as improved scratch-resistance and self-healing level. In particular, improvements were seen when hydroxyl PUSS® was used in specific ranges (e.g., about 1.0 wt % to about 6.0 wt % or about 1.0 wt % to about 4.5 wt % or about 1.5 wt % to about 5.0 wt % or about 1.5 wt % to about 3.5 wt % for POSS®-polyol; about 1.0 wt % to about 4.5 wt % or about 1.0 wt % to about 3.0 wt % for POSS®-diol).

Synergy between conductive nanoparticles and hydroxyl POSS® was observed in the compositions, improving both scratch-resistance and self-healing level. Improvements were seen where the conductive nanoparticles and hydroxyl PUSS® were used in specific ranges (e.g., about 7.6 wt % of $Sb_2O_3$ and about 2.0 wt % of POSS®-polyol in the SA1 coating or about 6.1 wt % of $Sb_2O_3$ and about 3.0 wt % of POSS®-polyol in the SA4 coating). Some examples showed no synergy (SA2).

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope of the present invention. It will be appreciated that one or more of the above embodiments may be combined with one or more of the other embodiments, unless explicitly stated otherwise.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed. Furthermore, no limitations are intended to the details of construction, composition, design, or steps herein shown, other than as described in the claims.

What is claimed is:

1. A method comprising the steps of:
    mixing:
        a self-healing coating solution;
        at least one of POSS or a POSS derivative;
        a dispersion of colloidal nanoparticles; and
        at least one of a solvent or a surfactant; and
    obtaining a composition, wherein the composition is capable of being cured into a coating that is transparent to visible light.

2. The method of claim 1, wherein the dispersion of colloidal nanoparticles comprises at least one of $Sb_2O_3$, $SnO_2$, ITO, ATO ($SnO_2/Sb_2O_5$), PTO ($SnO_2/P_2O_5$), $TiO_2$, ZnO, $Al_2O_3$, Au, Ag, or Cu.

3. The method of claim 2, wherein the dispersion of colloidal nanoparticles comprises a solid percentage of $Sb_2O_3$ nanoparticles in a dry coating formed from the composition in the range of about 2.0 wt % to about 11.0 wt %.

4. The method of claim 3, wherein the dispersion of colloidal nanoparticles comprises a solid percentage of $Sb_2O_3$ nanoparticles in a dry coating formed from the composition in the range of about 5.0 wt % to about 8.5 wt %.

5. The method of claim 2, wherein the dispersion of colloidal nanoparticles comprises a solid percentage of $SnO_2$ nanoparticle in a dry coating formed from the composition in the range of about 1.1 wt % to about 5.1 wt %.

6. The method of claim 5, wherein the dispersion of colloidal nanoparticles comprises a solid percentage of $SnO_2$ nanoparticle in a dry coating formed from the composition in the range of about 2.0 wt % to about 4.0 wt %.

7. The method of claim 2, wherein the dispersion of colloidal nanoparticles comprises as a solid percentage in a dry coating formed from the composition:
    $Sb_2O_3$ nanoparticles, in the range of about 2.0 wt % to about 11.0 wt %; and
    POSS-polyol, in the range of about 1.0 wt % to about 6.0 wt %.

8. The method of claim 7, wherein the dispersion of colloidal nanoparticles comprises as a solid percentage in a dry coating formed from the composition:
    $Sb_2O_3$ nanoparticles, in the range of about 5.0 wt % to about 8.5 wt %; and
    POSS-polyol, in the range of about 1.5 wt % to about 3.5 wt %.

9. The method of claim 1, wherein a POSS derivative further defined as a POSS-diol, POSS-triol, or POSS-polyol, is mixed into the solution.

10. The method of claim 9, wherein the solid percentage of POSS-polyol in a dry coating formed from the composition is in the range of about 1.0 wt % to about 6.0 wt %.

11. The method of claim 10, wherein the solid percentage of POSS-polyol in a dry coating formed from the composition is in the range of about 1.5 wt % to about 3.5 wt %.

12. The method of claim 1, wherein a POSS derivative further defined as a POSS-dithiol, POSS-trithiol, or POSS-polythiol, is mixed into the solution.

13. The method of claim 1, wherein the self-healing coating solution is a composition comprising at least two polycarbonate polyols and at least one blocked isocyanate.

14. The method of claim 1, wherein the method further comprises coating an ophthalmic lens with the composition.

* * * * *